US011756090B2

(12) United States Patent
Matula et al.

(10) Patent No.: US 11,756,090 B2
(45) Date of Patent: Sep. 12, 2023

(54) AUTOMATED COORDINATED CO-BROWSING WITH TEXT CHAT SERVICES

(71) Applicant: Avaya Inc., Santa Clara, CA (US)

(72) Inventors: Valentine C. Matula, Granville, OH (US); David Skiba, Golden, CO (US); George Erhart, Loveland, CO (US)

(73) Assignee: Avaya Inc., Santa Clara, CA (US)

( * ) Notice: Subject to any disclaimer, the term of this patent is extended or adjusted under 35 U.S.C. 154(b) by 1701 days.

(21) Appl. No.: 14/670,830

(22) Filed: Mar. 27, 2015

(65) Prior Publication Data

US 2016/0283995 A1 Sep. 29, 2016

(51) Int. Cl.
*G06Q 30/00* (2023.01)
*G06Q 30/0601* (2023.01)
*H04L 51/04* (2022.01)

(52) U.S. Cl.
CPC ..... *G06Q 30/0613* (2013.01); *G06Q 30/0623* (2013.01); *H04L 51/04* (2013.01)

(58) Field of Classification Search
CPC . G06Q 30/0613; G06Q 30/0623; H04L 51/04
USPC ...................................................... 705/26.41
See application file for complete search history.

(56) References Cited

U.S. PATENT DOCUMENTS

| | | | |
|---|---|---|---|
| 7,149,776 B1 | 12/2006 | Roy et al. | |
| 8,634,543 B2 | 1/2014 | Flockhart et al. | |
| 8,964,958 B2 | 2/2015 | Steiner | |
| 9,083,561 B2* | 7/2015 | Griesmer | H04L 12/6418 |
| 2002/0146668 A1* | 10/2002 | Burgin | G06F 16/954 |
| | | | 434/118 |
| 2010/0082746 A1* | 4/2010 | Ulrich | G06F 17/30873 |
| | | | 709/204 |
| 2010/0235218 A1 | 9/2010 | Erhart et al. | |
| 2011/0125793 A1 | 5/2011 | Erhart et al. | |
| 2011/0125826 A1 | 5/2011 | Erhart et al. | |
| 2012/0110472 A1* | 5/2012 | Amrhein | G06F 16/954 |
| | | | 715/753 |
| 2013/0104030 A1* | 4/2013 | Parreira | H04L 67/02 |
| | | | 715/234 |
| 2013/0142318 A1 | 6/2013 | Margolis et al. | |

(Continued)

OTHER PUBLICATIONS

Jiang, Z., Chan, J., Tan, B.C. and Chua, W.S., Effects of interactivity on website involvement and purchase intention, 2010, Journal of the Association of Information Systems, pp. 35-59. (Year: 2010).*

*Primary Examiner* — Jeffrey A. Smith
*Assistant Examiner* — Brittany E Bargeon
(74) *Attorney, Agent, or Firm* — Sheridan Ross P.C.

(57) ABSTRACT

Even with the best efforts to design and deliver accurate systems with usable interfaces, customers often encounter difficulties in completing a task using an electronic device, such as completing a form on a web page, using a software application, or navigating an interface. This may be due to a programming error, inaccurate instructions, or an unusual situation not contemplated by the programmers or designers. Without interaction with a human agent, a cue may be provided to the user upon detection of an issue for completing the task. A co-browse operation may be automatically initiated to provide a cue selected in accord with the issue that thereby allows the user to complete the task.

20 Claims, 6 Drawing Sheets

(56) References Cited

U.S. PATENT DOCUMENTS

| | | | |
|---|---|---|---|
| 2014/0098176 A1* | 4/2014 | Isaacs | H04W 4/60 |
| | | | 348/14.01 |
| 2014/0195588 A1 | 7/2014 | Badge | |
| 2014/0237039 A1* | 8/2014 | Bank | H04L 67/22 |
| | | | 709/204 |
| 2014/0258889 A1* | 9/2014 | Badge | G06F 17/30873 |
| | | | 715/760 |
| 2015/0262217 A1* | 9/2015 | Hoyne | G06Q 30/0242 |
| | | | 705/14.41 |

* cited by examiner

AUTOMATED COORDINATED CO-BROWSING WITH TEXT CHAT SERVICES

FIELD OF THE DISCLOSURE

The present disclosure is generally directed toward automatic systems to present task-progression cues on a user device.

BACKGROUND

Contact centers typically assist customers via a conversation between the customer and a live agent. Certain improvements have been made to assist the live agents, such as by providing the automation of certain features like interactive voice response (IVR), desktop sharing, including the ability to make changes for a customer as well as alternative modes of providing assistance, such as texting, voicemail, transcription, and follow-me. Newer solutions like co-browsing provide more technologically savvy and economically efficient ways to provide help to customers in real-time and in their environment without compromising security. However, co-browsing and assisted co-browsing currently require active participation by an agent, thereby increasing the costs associated with such activities.

SUMMARY

It is with respect to the above issues and other problems that the embodiments presented herein were contemplated.

In one embodiment, automated and semi-automated web-based co-browsing with automated text chat is provided. Co-browsing with multi-channel synchronization and recording is also provided by the embodiments disclosed herein. A communication system is provided to drive a text chat as an automated chat with co-browsing tied to it. Multi-channel automation picks an appropriate mode of communication. The communication may include chat and co-browsing.

For example, a patient fills out a Medicaid insurance form online. The communication system provides the back end that contains a co-browse record and an automation module to help the patient navigate through the input prior to agent matching and routing. The automation module can help the patient with information and assistance prior to sending the patient to the agent for human-to-human co-browsing. All self-service aspects are then completed with a warm handoff to the agent.

In another embodiment, the communication system, with the automation module, is also operable to introduce some jitter, mistakes, and false starts to make the interaction seem more natural to the patient. The automation module may be programmed to randomly or semi-randomly intersperse some mistakes into an interaction stream to simulate some humanness, but the automation may be set up to make fewer mistakes and have less misstarts than the live agent so that the productivity of automated sessions is better than interaction streams with the live agent. The types of mistakes that may be introduced may include, without limitation, misguided navigation of a cursor, mistaken selections of a link, mistaken highlights of content on a web page, misspellings in a text chat, delayed responses to questions, etc.

In one embodiment, the communication system performs actions, such as:

1. A customer initiates contact with a company for assistance through chat or general click to help.

2. Based on information from the customer and browsing history, the system is operable to identify that automated co-browse may be able to meet the customer's need, either partially or completely.

3. The system optionally gets approval from the customer and engages in an automated attempt to help through the combination of automated chat responses, mouse movements, screen pointers, screen changes, audio/video instructions, etc.

4. Operations walk the customer through specific issues or stages using automation-driven methods.

5. If the customer becomes stuck, or the automation reaches a point where a live agent is needed or becomes available, the system moves the interaction over to an agent, optionally providing fast replay of the automated actions (e.g., chat responses, mouse movements, screen pointers, screen changes, instructions, etc.) to catch the agent up and the agent can then take over.

6. The handoff may be invisible to the customer as no break in the co-browse session has occurred.

In one embodiment, a system is disclosed, comprising: a network interface; a data storage; and a processor configured to conduct an automated co-browsing interaction, with a customer using a customer device, over a network connected thereto by the network interface, comprising: receive signals, via the network interface, from the customer device, the signals being associated with a task performed on the customer device; access, from the data storage, a co-browsing behavior in accord with the task; and transmit signals, via the network interface, operable to cause the customer device to present the co-browsing behavior.

In another embodiment, a method is disclosed, comprising: receiving signals from a customer device, the signals being associated with elements of a task performed on the customer device and a first indicator associated with an issue to completing the task; accessing an issue-cue record having an issue portion and a cue portion; and upon determining the issue to completing the task matches the issue portion of the issue-cue record, causing a signal to be sent to the customer device that when received by the customer device causes the customer device to present the cue portion to suggest a resolution to the issue to completing the task.

In another embodiment, a non-transitory computer-readable medium is disclosed having stored thereon instructions that when read by the computer cause the computer to perform: receiving signals from a customer device, the signals being associated with elements of a task performed on the customer device and a first indicator associated with an issue to completing the task; accessing an issue-cue record having an issue portion and a cue portion; and upon determining the issue to completing the task matches the issue portion of the issue-cue record, causing a signal to be sent to the customer device that when received by the customer device causes the customer device to present the cue portion to suggest a resolution to the issue to completing the task.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
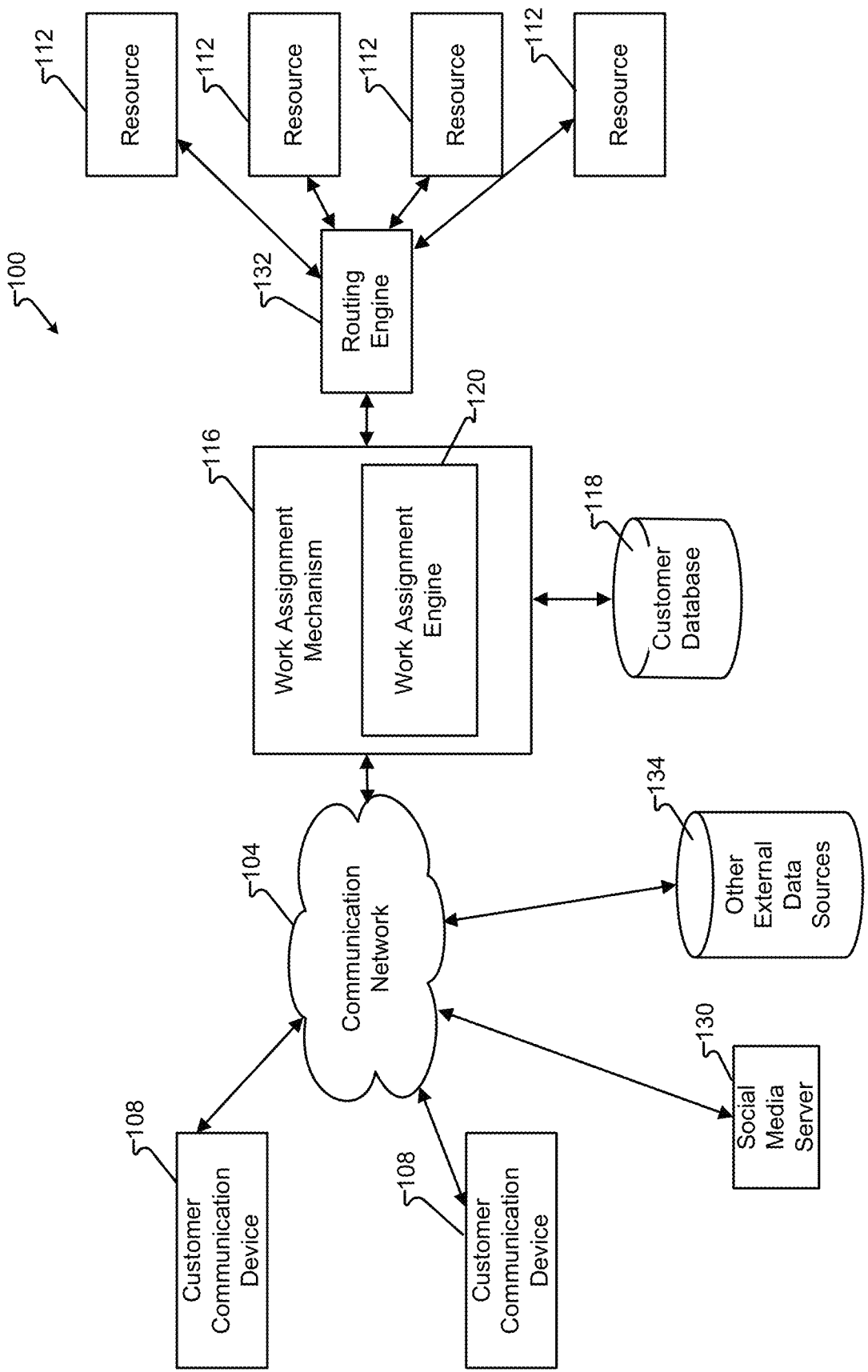
FIG. 1 depicts a first communication system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108. Additionally, social media website 130 and/or other external data sources 134 may be utilized to provide one means for a resource 112 to receive and/or retrieve contacts and connect to a customer of a contact center. Other external data sources 134 may include data sources, such as service bureaus, third-party data providers (e.g., credit agencies, public and/or private records, etc.). Customers may utilize their respective customer communication device 108 to send/receive communications utilizing social media website 130.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which is hereby incorporated herein by reference in its entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like, until a resource 112 is assigned to the work item representing that communication at which point the work assignment mechanism 116 passes the work item to a routing engine 132 to connect the communication device 108, which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processor with co-browsing behaviors, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to the contact center. Customer database 118 may be updated in response to a work item and/or input from resource 112 processing the work item.

In one embodiment, a message is generated by customer communication device 108 and received, via communication network 104, at work assignment mechanism 116. The message received by a contact center, such as at the work assignment mechanism 116, is generally, and herein, referred to as a "contact." Routing engine 132 routes the contact to at least one of resources 112 for processing.

Figure 2:
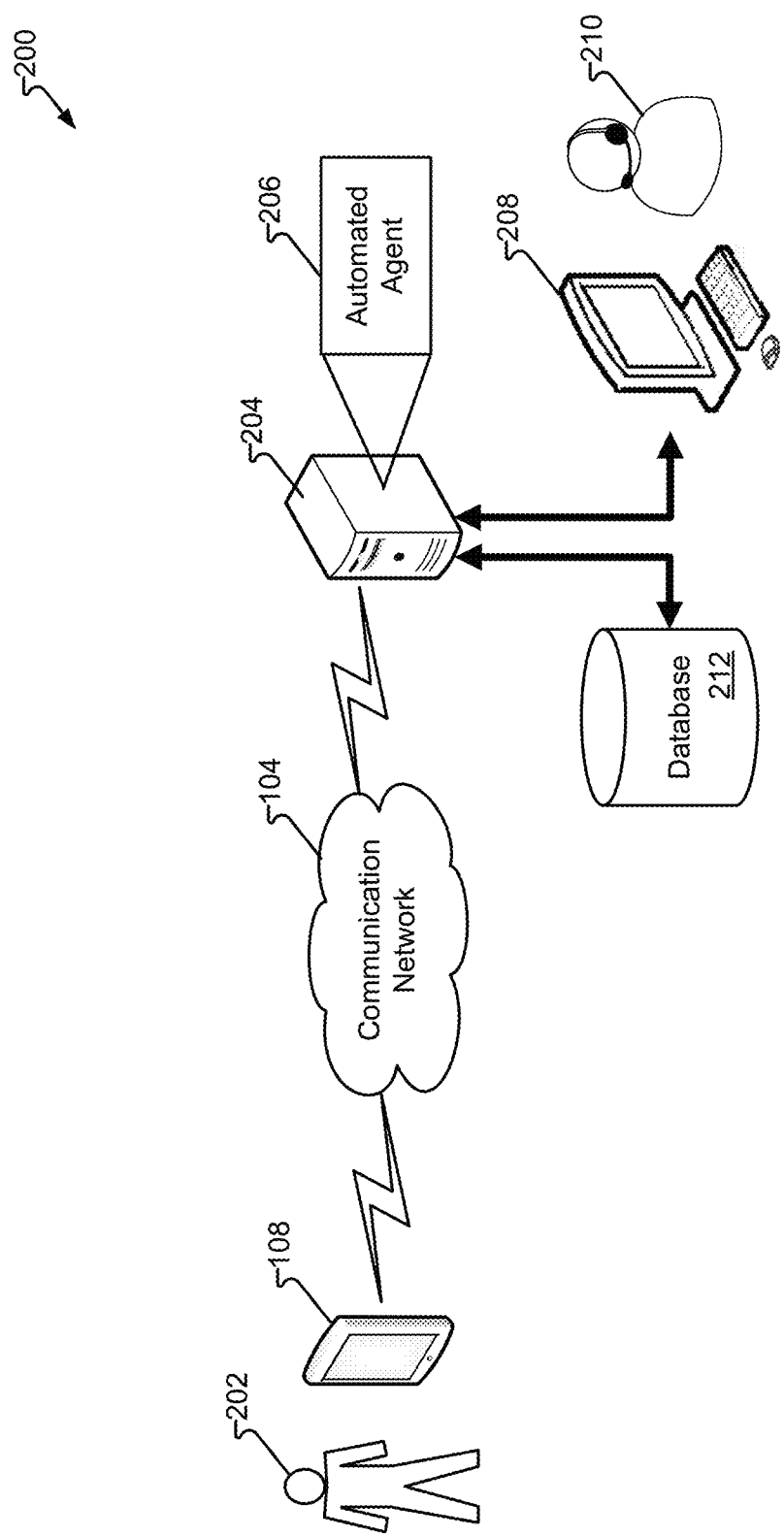
FIG. 2 depicts a second communication system in accordance with embodiments of the present disclosure.

FIG. 2 depicts communication system 200 in accordance with embodiments of the present disclosure. In one embodiment, customer 202 utilizes customer communication device 108 to communicate with server 204 over communications network 104. Server 204 may be executing one or more task-related processes, such as serving webpages, receiving inputs, accessing data, writing records, load balancing, backups, and/or other processes associated with a server. Server 204 may perform data validation on inputs received from customer 202 on customer communication device 108. As will be more fully explained below, data validation is different and may be executed in parallel with the detection of an issue preventing completion of the task and the providing of the cue to assist customer 202 in resolving the issue to completing the task.

In one embodiment, server 204 executes automated agent 206. Automated agent 206 comprises one of resources 112 comprising computational components and excluding any human interactions. Server 204 may also incorporate connections to agent terminal 208 and human agent 210. Agent terminal 208 and human agent 210 comprise one of resources 112 comprising at least a live agent and operable to provide human interaction with customer 202. Server 204 may incorporate and/or access database 212, such as to perform data lookups, access code, access customer records, etc.

Customer 202 may be providing inputs to customer communication device 108 for the performance of task elements comprising a task. The task may be any task comprising task elements for which the progress may be monitored and evaluated. For example, customer 202 may be filling out a form on a website, executing a program, setting a configuration for a hardware or software element, or other operation utilizing customer communication device 108. Each element of the form being a task element. Server 204 may detect an issue to completing the task. In one embodiment server 204 determines that progress towards completing the task has stalled and, as a result, determines an issue exist to completing the task. In other embodiments, server 204 may determine that customer 202 has revisited the same graphical elements presented on customer communication device 108 multiple times, and therefore an issue to completing the task is thereby detected. In another embodiment, server 204 and/or customer communication device 108 presents the same error message or a number of different messages regarding the same task element more than a predetermined threshold number of times, and therefore determines an issue exist to completing the task.

In another embodiment, server 204, a processor therein, automated agent 206, or another component may access issue-cue records in database 212. Issue-cue records in database 212 may be compared against an indicator associated with the issue preventing completion of the task. For example, an indicator associated with an address field indicating an issue preventing completion of the task, may be identified with an issue of an issue-cue record, wherein address field issues are provided in association with one or more resolution cues. In another embodiment, automated agent 206 provides the selected cue to customer communication device 108 for display thereon, for example, to highlight a portion of a webpage (e.g., field, entry, graphical element, etc.) and/or provide a textual instruction to perform an action (e.g., "You are not able to enter data in the 'spouse's name' field as your marital status is set to 'single'").

Once server 204 determines that an issue to completing the task exists, automated agent 206 may provide a co-browsing behavior as a cue to the customer communication device 108 that, when utilized by customer 202, resolves the issue preventing completion of the task. In another embodiment, a subsequent determination is made indicating that the cue did not resolve the issue to completing the task. Server 204 may then signal human agent 210, such as via agent terminal 208, to provide live assistance to customer 202 to resolve the issue to completing the task.

Automated co-browsing provided by server 204 may be better received by the customer associated with customer communication device 108 if the customer believes the co-browsing behaviors provided by server 204 are originating from a human agent. Accordingly, the cue may be a number of co-browsing behaviors with certain non-consequential errors interspersed therein. For example, a spelling error that is either corrected or, if of no significance, left in place; selecting a wrong option and then selecting the correct option, moving the pointer displayed on the customer communication device 108 in a manner associated with a human who is unsure of an action (e.g., circling, pointing to an element then another, jitter, etc.).

While certain data processing performance advantages may be provided by executing automated agent 206 on server 204, with customer communication device 108 communicating therewith, it should be appreciated by those of ordinary skill in the art that another device, such as customer communication device 108, may be configured to execute automated agent 206 and/or host database 212 without departing from the disclosure provided herein. In another embodiment, customer communication device 108 may comprise a plurality of devices or a single device in communication with another device, each of which being associated with customer 202 (e.g., a tablet computer and a desktop computer, a plurality of mobile devices in communication with each other, etc.). At least one of a plurality of devices comprising communication device 108 may then execute automated agent 206 and/or host database 212. Similarly, server 204 may comprise a single hardware device executing both task-related functionality (e.g., serving webpages, processing forms, etc.) and automated agent 206. In another embodiment, server 204 is a plurality of hardware devices and/or virtual devices (e.g., "cloud" services), each performing at least a portion of the task-related functionality and automated agent 206.

Figure 3:
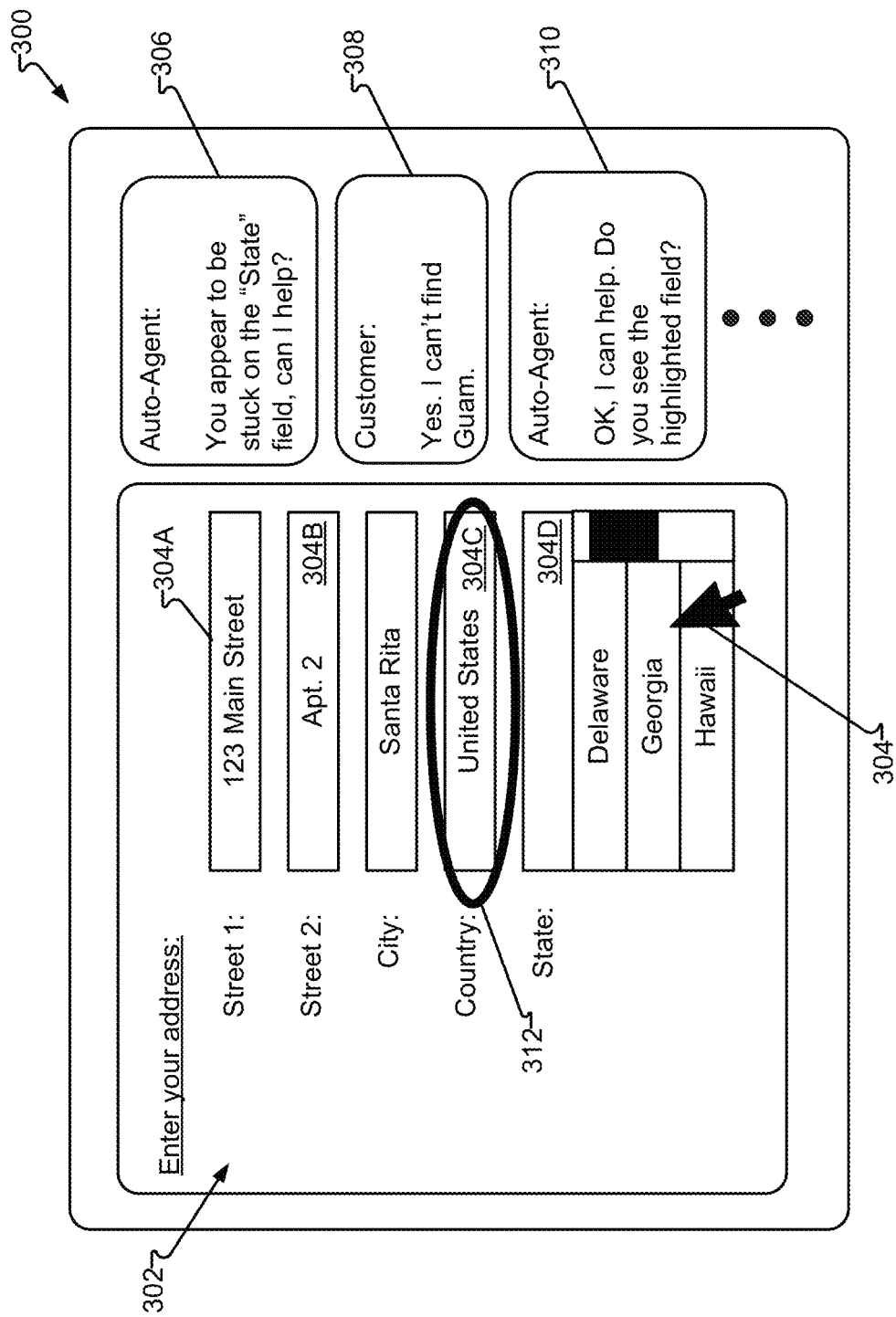
FIG. 3 depicts a display in accordance with embodiments of the present disclosure.

FIG. 3 depicts display 300 in accordance with embodiments of the present disclosure. In one embodiment, display 300 is presented upon customer communication device 108 to solicit inputs from customer 202. Tasks 302, such as the completion of a form, is initiated by customer 202 and completed by completing task elements 304. For example, customer 202 performs task elements 304A-304C, thereby providing a first and second street address, city, and country, respectively and thereby completing the task of providing their address. However, an issue to completion of task 302 may be detected, which may be indicated by user pointer 304 pausing, not selecting, hovering, revisiting the same task elements, or otherwise not selecting an entry for task element 304D (selection of a state).

In one embodiment, upon determining that an issue exists preventing completion of the task, automated agent 206 and/or server 204 initiates a text channel whereby text message 306 caused to be presented on display 300. Text message 306 may provide an introduction or otherwise request permission to provide a cue to resolve the issue to completing the task. For example, text message 306 may request permission to help customer 202 in completing tasks 302. Customer 202 may respond in the affirmative via analysis of text message 308 or other input. In response, server 204 may then cause automated agent 206 to select and present cue 312 on display 300. In another embodiment, text message 310 may provide alternative or additional instruction to completing tasks 302. As a result, a text channel, such as providing text messages 306, 308, 310, may be synchronized with other channels, such as the channel hosting graphical presentations, such as for the presentation of cue 312, as well as interaction channel presenting tasks 302 and task elements 304 as well as receiving inputs from customer 202.

In another embodiment, following the presentation of cue 312 and/or instructional message 310, an indicator associated with a failure to remedy the issue to completing the task is again determined to be present, the text or other channel may be connected to a live agent to further assist customer 202 in completing task 302. In another embodiment, server 204 may monitor the activities of a live agent, such as live agent 210, to determine what actions were taken and whether such actions were successful or not. If the actions of live agent 210 were successful, database 212 may be updated and thereby provide a cue to a future issue to completing task 302 in accord with the cue provided by human agent 210. As a result, database 212 may be dynamically updated in response to a need to incorporate the inputs of human agent 210 into future actions of automated agent 206. As can be appreciated, this may be particularly beneficial when the content on the data channel (e.g., validation of a field, etc.) has not been maintained with respective updates in the associated issue-cue records. For example, customer 202 may be unable to find "Guam" as a state, automated agent 206 may suggest setting the country to "Guam," which may have been an accurate instruction at one time. If customer 202 is unable to proceed and human agent 210 is incorporated to resolve the issue, such as to indicate that "Guam" is available in the "State" field upon selecting "US Territories" as a country. As a result, the associated issue-cue record may be automatically updated accordingly.

Figure 4:
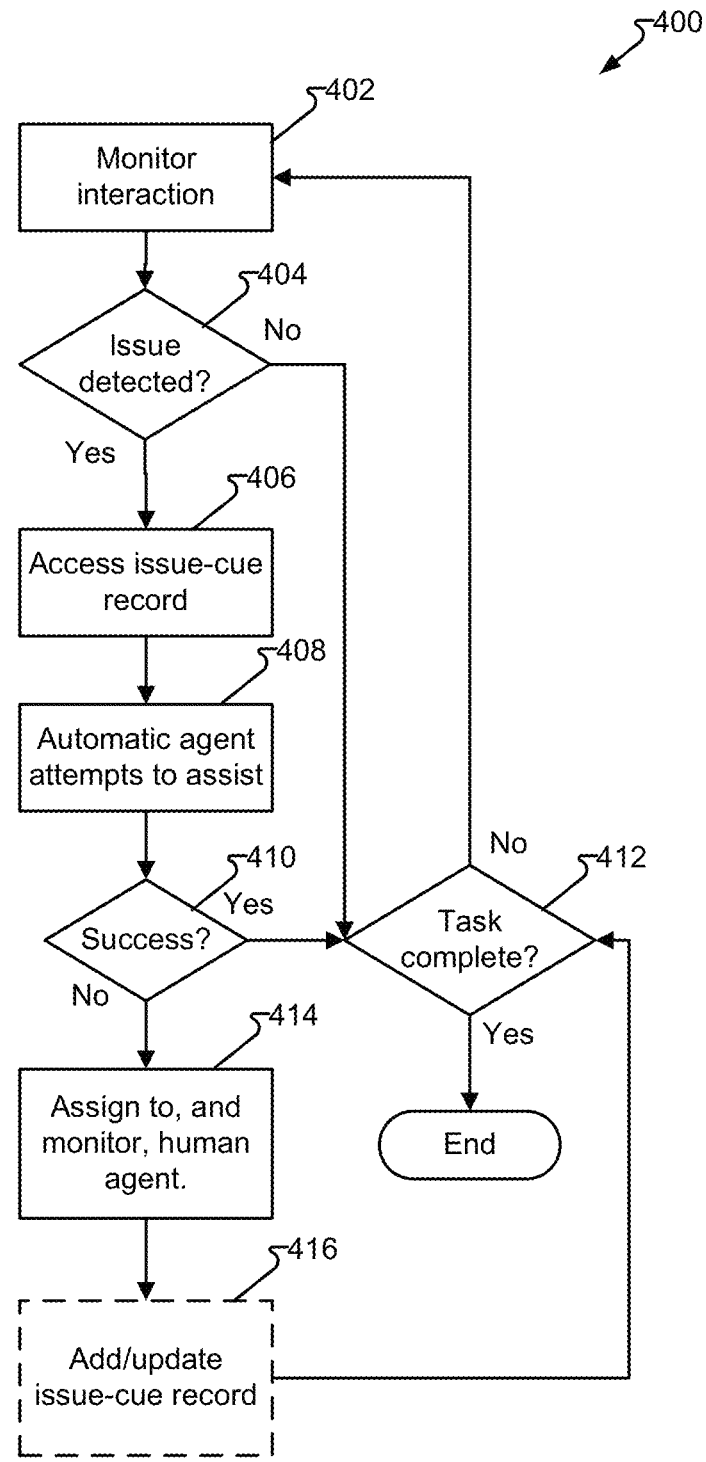
FIG. 4 depicts a first process in accordance with embodiments of the present disclosure.

FIG. 4 depicts a process for 400 in accordance with embodiments of the present disclosure. In one embodiment, process 400 begins at step 402 where the interaction between customer 202, utilizing customer communication device 108 and server 204 is monitored, such as to determine the progress towards completing a particular task, such as task 302 where the progression from one task element to another task element occurs in a timely and/or productive manner, such as from task 304A proceeding to task 304B within a predetermined threshold of time. Step 404 determines if an issue to completing the task has been detected and if step 404 is determined in the negative, processing may continue to step 412, whereby if the task is complete process 400 may end, otherwise processing may return to step 402, such as to continue monitoring the interaction utilizing customer communication device 108.

Next, step 406 accesses an issue-cue record. Step 406 may optionally include searching for a match between the issue detected that is preventing completion of the task and entries in a database comprising a number of issue-cue records. In step 408 and automated agent, such as automated agent 206 attempts to provide a cue and thereby resolve the issue to completing the task 302. Step 410 evaluates whether automatic agent 206 was successful and thereby able to resolve the issue preventing completion of the task. If step 410 is answered in the affirmative, processing may continue to step 412. If step 412 determines that the task has been completed, process 400 may end otherwise process 412 returns to monitoring step 402.

In another embodiment, step 410 has been determined not to be successful in processing, so processing continues at step 414 wherein a human agent, such as human agent 210, is incorporated into the resolution channel, such as a text channel, voice channel, video channel, and/or co-browse channel to resolve the issue preventing completion of the task. As a further option, step 416 may be executed wherein the actions of human agent 414 are provided as an update and/or addition to a database or other record repository having an issue-cue record associated with the issue, which was detected at monitoring step 402.

Figure 5:
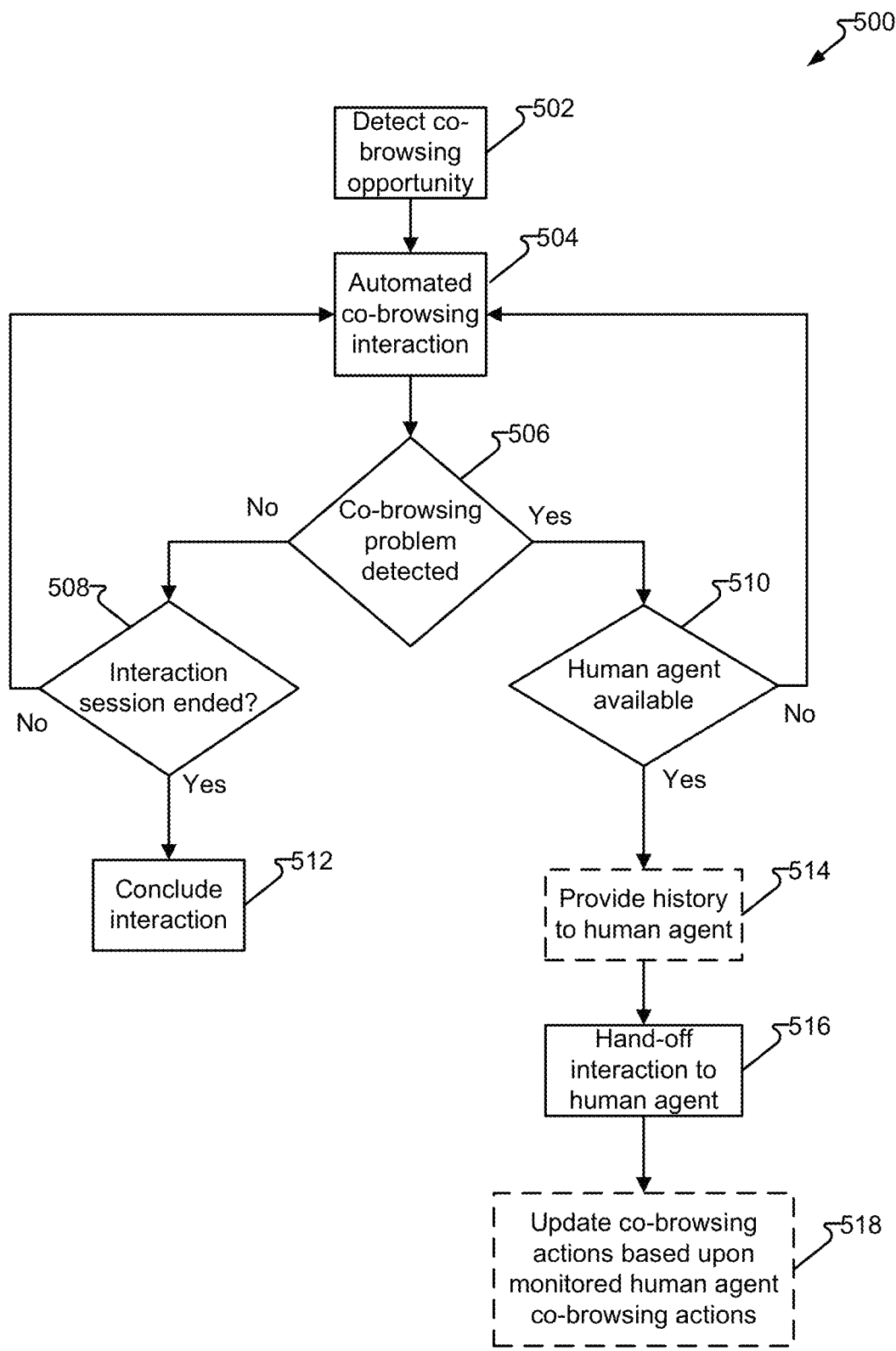
FIG. 5 depicts a second process in accordance with embodiments of the present disclosure.

FIG. 5 depicts a process for 500 in accordance with embodiments of the present disclosure. In one embodiment, process 500 starts with step 502 determined that a co-browsing opportunity has been detected. Step 502 may determine that a user is struggling to complete a task or explicitly indicates a need for assistance. Step 504 then launches a co-browsing interaction with the user whereby co-browsing behaviors are provided to the user's device, such as customer communication device 108. The co-browsing behaviors may include random, pseudo-random, and/or pre-programmed non-consequential errors to mimic human errors and appear more human-like. Consequential errors, such as misspelling a name on an important form, may be incorporated, but are preferably be corrected prior to submitting the form or performing another action that requires significant effort to correct.

Step 506 determines if a co-browsing problem has been detected. For example, if a co-browsing behavior is being undone by the user, the user indicates an error (e.g., "No, that's not right."), and/or a failure to resolve the issue (e.g., "That didn't work."). If Step 506 is determined to the negative, process 504 may continue to step 508 which determines of the interaction has concluded. If yes, process 500 may continue to step 512 whereby the interaction is concluded. If step 508 is no, process 500 continues back to step 504.

If step 506 determines that there is a co-browsing problem, process 500 may continue to step 510 to determine if a human agent is available or if a human agent could become available within an acceptable timeframe. If no, process 500 may pause, stop, slow-down, or return to step 504 to attempt to continue the interaction. If a human agent is available, processing may continue to optional step 514 to present a recording of the interaction to the human agent, such as to provide additional context and co-browsing behaviors that have been performed in step 504. Process 500 continues to step 516 to hand-off the interaction to the human agent to assist the customer, such as by co-browsing or other interaction. Optionally, step 518 may monitor the actions of the human agent and add/modify the co-browsing behaviors accordingly, such as to improve the success of a future execution of step 504.

Figure 6:
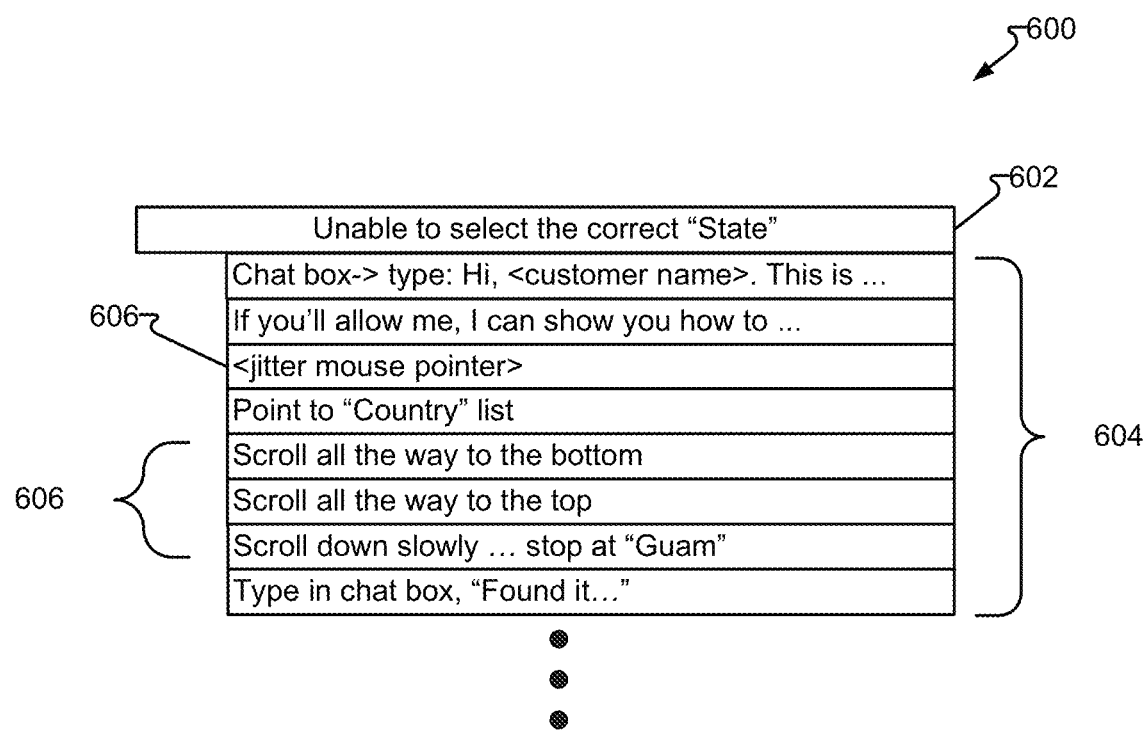
FIG. 6 depicts a table in accordance with embodiments of the present disclosure. In one embodiment.

FIG. 6 depicts table 600 in accordance with embodiments of the present disclosure. In one embodiment, table 600 includes issue 602, for which a co-browsing interaction session is addressing. Co-browsing behaviors 604 are then executed which may include, or have inserted into an execution stream, human-mimicking co-browsing behaviors 606. As can be appreciated the English text provided in table 600 describing co-browsing behaviors 602 would in addition or alternative incorporate machine-executable code to be transmitted to customer communication device 108 for execution thereon during a co-browsing interaction.

Aspects of the present disclosure include co-browsing behavior, which may provide a cue on customer device 108. The co-browsing behavior may comprise at least one of a set of co-browsing elements, further comprising, a pointer movement, a pointer click, a pointer select, typing a text character, typing a command, highlighting a graphical behavior element displayed on customer device 108, selecting a graphical behavior element displayed on customer device 108, and movement of a graphical behavior element displayed on customer device 108. In another aspect, a data storage such as database 212, stores for access, the co-browsing behavior. Server 204 or a processor therein, may then access the co-browsing behavior which, in another aspect, may comprise the foregoing set of co-browsing elements. Accessing the set of co-browsing elements may be via a variable. The variable may comprise at least one of frequency, severity, and type and, when presented on customer device 108, may cause customer 202 of customer device 108 to perceive the least one of frequency, severity, and type of the set of co-browsing elements as human error. For example, the interspersing of non-consequential errors at a frequency perceived as occurring at a frequency of human error. In another example, an error type, such as a spelling error, that has a severity of no significance may be provided for perception as human error.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
   a network interface;
   a data storage; and
   a processor configured to conduct an automated co-browsing interaction with a customer device over a network via the network interface, wherein, the customer device is operated by a customer, and wherein the processor is configured to:
   receive a first set of signals, via the network interface, from the customer device, the first set of signals being associated with a task on the customer device, wherein the task comprises a task element to be completed via the customer device;
   determining, whether the first set of signals indicates a failure to complete the task upon determining that progress to complete the task element has stalled; and
   in response to determining that the first set of signals indicate the failure to complete the task:
   access, from the data storage, a co-browsing behavior in accordance with the task;
   transmit a second set of signals, via the network interface, to cause the customer device to present the co-browsing behavior associated with completing the task;
   monitor the automated co-browsing interaction, following transmission of the second set of signals, and determine therefrom, whether the second set of signals failed to complete the task; and
   upon determining that the second set of signals failed to complete the task, connect the automated co-browsing interaction to an agent terminal operated by a human agent and cause the automated co-browsing interaction to include a third set of signals from the agent terminal.

2. The system of claim 1, wherein the co-browsing behavior is a set of co-browsing behavior elements, the set of co-browsing behavior elements being in accord with the task.

3. The system of claim 2, wherein at least one of the set of co-browsing behavior elements comprises a non-consequential error that mimics a human error.

4. The system of claim 3, wherein the processor is further configured to access the at least one of the set of co-browsing behavior elements with a variable of at least one of frequency, severity, and type that when co-browsing behavior elements comprising the non-consequential error is presented on the customer device.

5. The system of claim 2, wherein at least one of the set of co-browsing behavior elements comprises at least one of, a pointer movement, a pointer click, a pointer select, typing a text character, typing a command, highlighting a graphical behavior element displayed on the customer device, selecting a graphical behavior element displayed on the customer device, and movement of a graphical behavior element displayed on the customer device.

6. The system of claim 1, wherein the processor is further configured to receive signals indicating a request for assistance.

7. The system of claim 1, wherein the processor is further configured to receive, as a portion of the first set of signals, a signal selecting human interaction and in response thereto, performing the connecting of the automated co-browsing interaction to the agent terminal.

8. The system of claim 7, wherein the processor, prior to connecting the automated co-browsing interaction to the agent terminal, receives a signal indicating availability of the human agent.

9. The system of claim 7, wherein the processor is further configured to cause the data storage to maintain a recording of the automated co-browsing interaction.

10. The system of claim 1, wherein the processor is configured to determine, that the first set of signals indicate the failure to complete the task upon determining that progress to complete the task element has stalled, further comprising:
determining the first set of signals indicate the customer device, operated by the customer, has revisited the same graphical element multiple times.

11. The system of claim 1, wherein the processor is configured to determine, that the first set of signals indicate the failure to complete the task upon determining that progress to complete the task element has stalled, further comprising:
determining that, in response to the first set of signals, multiple presentations of an error message has been presented by the customer device.

12. The system of claim 1, wherein the processor is configured to determine, that the first set of signals indicate the failure to complete the task upon determining that progress to complete the task element has stalled, further comprising:
determining that, in response to the first set of signals, a number of errors have been presented by the customer device, each of the number of errors being associated with the same task element.

13. The system of claim 12, wherein the number of errors comprise dissimilar errors.

14. A system, comprising:
a network interface;
a data storage; and
a processor configured to conduct an automated co-browsing interaction with a customer device over a network via the network interface, wherein, the customer device is operated by a customer, and wherein the processor is configured to:
receive a first set of signals, via the network interface, from the customer device, the first set of signals being associated with a task on the customer device, wherein the task comprises a task element to be completed via the customer device;
determining whether the first set of signals indicate a failure to complete the task upon determining that progress to complete the task element has stalled; and
in response to determining that the first set of signals indicates the failure to complete the task:
access, from the data storage, a co-browsing behavior in accordance with the task; and
transmit a second set of signals, via the network interface, operable to cause the customer device to present the co-browsing behavior associated with completing the task.

15. The system of claim 14, wherein the processor is further configured to, in response to determining the first set of signals indicate the failure to complete that task:
monitor the automated co-browsing interaction, following transmission of the second set of signals, and determining therefrom, whether the second set of signals failed to complete the task; and
upon determining the second set of signals failed to complete the task, connecting the automated co-browsing interaction to an agent terminal operated by a human agent and causing the automated co-browsing interaction to include a third set of signals from the agent terminal.

16. The system of claim 14, wherein the co-browsing behavior is a set of co-browsing behavior elements, the set of co-browsing behavior elements being in accord with the task.

17. The system of claim 16, wherein at least one of the set of co-browsing behavior elements comprises a non-consequential error that mimics a human error.

18. The system of claim 17, wherein the processor is further configured to access the at least one of the set of co-browsing behavior elements with a variable of at least one of frequency, severity, and type that when co-browsing behavior elements comprising the non-consequential error is presented on the customer device.

19. The system of claim 16, wherein at least one of the set of co-browsing behavior elements comprises at least one of, a pointer movement, a pointer click, a pointer select, typing a text character, typing a command, highlighting a graphical behavior element displayed on the customer device, selecting a graphical behavior element displayed on the customer device, and movement of a graphical behavior element displayed on the customer device.

20. The system of claim 14, wherein the processor is further configured to:
receive, as a portion of the first set of signals, a signal selecting human interaction and in response thereto, performing the connecting of the automated co-browsing interaction to an agent terminal of a human agent;
prior to connecting the automated co-browsing interaction to the agent terminal, receives a signal indicating availability of the human agent; and
cause the data storage to maintain a recording of the automated co-browsing interaction.

* * * * *